United States Patent
Hu

(10) Patent No.: US 12,369,077 B2
(45) Date of Patent: Jul. 22, 2025

(54) MEASUREMENT CONTROL METHODS AND NETWORK DEVICE

(71) Applicant: GUANGDONG OPPO MOBILE TELECOMMUNICATIONS CORP., LTD., Guangdong (CN)

(72) Inventor: Rongyi Hu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 388 days.

(21) Appl. No.: 17/809,811

(22) Filed: Jun. 29, 2022

(65) Prior Publication Data

US 2022/0338074 A1  Oct. 20, 2022

Related U.S. Application Data

(63) Continuation of application No. PCT/CN2019/130171, filed on Dec. 30, 2019.

(51) Int. Cl.
 *H04W 36/00* (2009.01)
 *H04W 36/08* (2009.01)
 *H04W 36/32* (2009.01)

(52) U.S. Cl.
 CPC ....... *H04W 36/0058* (2018.08); *H04W 36/08* (2013.01); *H04W 36/322* (2023.05)

(58) Field of Classification Search
 CPC ............. H04W 36/0058; H04W 36/08; H04W 36/322; H04W 48/12; H04W 52/0254; H04W 24/10; Y02D 30/70
 USPC ......................................................... 370/331
 See application file for complete search history.

(56) References Cited

U.S. PATENT DOCUMENTS

| | | | |
|---|---|---|---|
| 2013/0229931 A1* | 9/2013 | Kim | H04W 48/16 370/252 |
| 2014/0370914 A1 | 12/2014 | Jung | |
| 2016/0014628 A1 | 1/2016 | Kim | |
| 2016/0262077 A1 | 9/2016 | Zhang et al. | |
| 2017/0034730 A1 | 2/2017 | Zhang et al. | |
| 2017/0353989 A1 | 12/2017 | Kim | |

(Continued)

FOREIGN PATENT DOCUMENTS

| | | |
|---|---|---|
| CN | 102026271 A | 4/2011 |
| CN | 103581989 A | 2/2014 |

(Continued)

OTHER PUBLICATIONS

CMCC, "Discussion on power saving in inter-frequency measurements", R2-1904329, 3GPP TSG RAN WG2 #105bis R2-1904329, Apr. 8-Apr. 12, 2019, the whole document, 5 pages.

(Continued)

*Primary Examiner* — Huy C Ho
(74) *Attorney, Agent, or Firm* — PERKINS COIE LLP

(57) ABSTRACT

A measurement control method implemented by a network device includes that: the network device sends an assistance message to a terminal device, the assistance message being used for adjusting a mobility measurement behavior of the terminal device. A measurement control method implemented by a terminal device includes that: the terminal device receives an assistance message from a network device, the assistance message being used for adjusting a mobility measurement behavior of the terminal device. A network device is also provided.

16 Claims, 12 Drawing Sheets

(56) References Cited

U.S. PATENT DOCUMENTS

2019/0159076 A1    5/2019    Kim
2021/0045000 A1*   2/2021    Dalsgaard ............. H04W 24/10
2021/0051544 A1    2/2021    Lee et al.
2022/0369146 A1   11/2022   Dalsgaard et al.

FOREIGN PATENT DOCUMENTS

| | | |
|---|---|---|
| CN | 109121144 A | 1/2019 |
| CN | 110475282 A | 11/2019 |
| JP | 2014195317 A | 10/2014 |
| JP | 2018041996 A | 3/2018 |
| WO | 2019197711 A1 | 10/2019 |

OTHER PUBLICATIONS

First Office Action of the Japanese application No. 2022-540359, issued on Nov. 28, 2023, 8 pages with English translation.

Vivo, "Discussion on UE assistance information for power saving", R1-1910236, 3GPP TSG RAN WG1 #98b R1-1910236, Oct. 14-20, 2019, the whole document, 4 pages.

Huawei, HiSilicon, "PDCCH-based power saving signal/channel", R1-1912915, 3GPP TSG RAN WG1 #99 R1-1912915, Nov. 18-22, 2019, the whole document, 19 pages.

Search Report by Registered Search Organization of the Japanese application No. 2022-540359, issued on Oct. 18, 2023, 51 pages with English translation.

Ericsson, [E141] Adding spectrum emission and Pmax related configuration per multi band, 3GPP TSG-WG2 Meeting #103 R2-1813255, Gothenburg, Sweden, Aug. 20-24, 2018.

International Search Report in the international application No. PCT/CN2019/130171, mailed on Sep. 30, 2020.

3GPP TS 38.331 V15.7.0 (Sep. 2019), 3rd Generation Partnership Project; Technical Specification Group Radio Access Network; NR; Radio Resource Control (RRC) protocol specification, (Release 15).

3GPP TS 38.133 V15.7.0 (Sep. 2019), 3rd Generation Partnership Project; Technical Specification Group Radio Access Network; NR; Requirements for support of radio resource management, (Release 15).

Nokia, Nokia Shanghai Bell, Signalling for euCA, 3GPP TSG-RAN WG2 Meeting #102 R2-1813000, Busan, South Korea, May 21-25, 2018.

Rapporteur (Ericsson), Running CR for 38.331 for CA&DC enh, 3GPP TSG-RAN WG2 Meeting #107bis R2-1912538, Chongqing, China, Oct. 14-18, 2019.

Written Opinion of the International Search Authority in the international application No. PCT/CN2019/130171, mailed on Sep. 30, 2020.

Ericsson: "On SSB-ToMeasure clarifications", 3GPP Draft; R2-1915424, 3rd Generation Partnership Project (3GPP), vol. RAN WG2, no. Reno, USA; Nov. 18, 2019-Nov. 22, 2019 Nov. 7, 2019 (Nov. 7, 2019), XP051815901. 15 pages.

Supplementary European Search Report in the European application No. 19958101.8, mailed on Nov. 28, 2022. 13 pages.

* cited by examiner

A terminal device receives an assistance message from a network device — 31

FIG. 3

Second communication unit 51

FIG. 8

MEASUREMENT CONTROL METHODS AND NETWORK DEVICE

CROSS-REFERENCE TO RELATED APPLICATION

This application is a U.S. continuation application of International Application No. PCT/CN2019/130171, entitled "MEASUREMENT CONTROL METHOD, NETWORK DEVICE, AND TERMINAL DEVICE", filed on Dec. 30, 2019, the disclosure of which is hereby incorporated by reference in its entirety.

TECHNICAL FIELD

The disclosure relates to the technical field of information processing, and in particular to methods for measurement control, and a network device.

BACKGROUND

In the communication technology, when a terminal accesses a cell or carries out some other communication processes, it usually involves the process of measurement and reporting. In the process of measurement and reporting, the terminal device measures corresponding reference signals at the corresponding measurement frequencies according to a measurement configuration configured by the network device for the terminal device, and then the terminal device reports measurement results.

SUMMARY

In order to solve the above technical problems, embodiments of the disclosure provide methods for measurement control, and a network device.

According to a first aspect, a method for measurement control is provided, which includes the following operation.

A network device transmits an assistance message to a terminal device, the assistance message is used for adjusting a mobility measurement behavior of the terminal device.

According to a second aspect, a method for measurement control is provided, which includes the following operation.

A terminal device receives an assistance message from a network device, the assistance message is used for adjusting a mobility measurement behavior of the terminal device.

According to a third aspect, a network device is provided, which includes a transceiver.

The transceiver transmits an assistance message to a terminal device, the assistance message is used for adjusting a mobility measurement behavior of the terminal device.

SUMMARY BRIEF DESCRIPTION OF THE DRAWINGS

FIG. 3 is a second flowchart of a method for measurement control according to an embodiment of the disclosure.

FIG. 8 is a schematic structural diagram of a terminal device according to an embodiment of the disclosure.

DETAILED DESCRIPTION

In order to have a more detailed understanding of features and technical contents of the embodiments of the disclosure, the embodiments of the disclosure will be described in detail below in conjunction with the accompanying drawings. The drawings are provided for illustration only and are not intended to limit the embodiments of the disclosure.

In the process of measurement and reporting, the terminal device measures corresponding reference signals at the corresponding measurement frequencies according to a measurement configuration configured by the network device for the terminal device, and then the terminal device reports measurement results. However, in this measurement processing method, it is impossible to reduce a power consumption of the terminal device caused by measurement and reporting without affecting a measurement effect or communication effect, and an energy-saving effect of terminal cannot be guaranteed.

The technical solutions of the embodiments of the disclosure will be described below in conjunction with the drawings in the embodiments of the disclosure, and it is apparent that the described embodiments are part of the embodiments of the disclosure, but not all of them. Based on the embodiments in the disclosure, all other embodiments obtained by those of ordinary skill in the art without making creative efforts fall within the scope of protection of the disclosure.

The technical solutions of the embodiments of the disclosure can be applied to various communication systems, such as: a Global System of Mobile Communication (GSM) system, a Code Division Multiple Access (CDMA) system, a Wideband Code Division Multiple Access (WCDMA) system, a General Packet Radio Service (GPRS) system, an Long Term Evolution (LTE) system, an LTE Frequency Division Duplex (FDD) system, an LTE Time Division Duplex (TDD) system, a Universal Mobile Telecommunications System (UMTS), a Worldwide Interoperability for Microwave Access (WiMAX) communication system or a $5^{th}$ generation wireless communication (5G) system, etc.

Figure 1A:
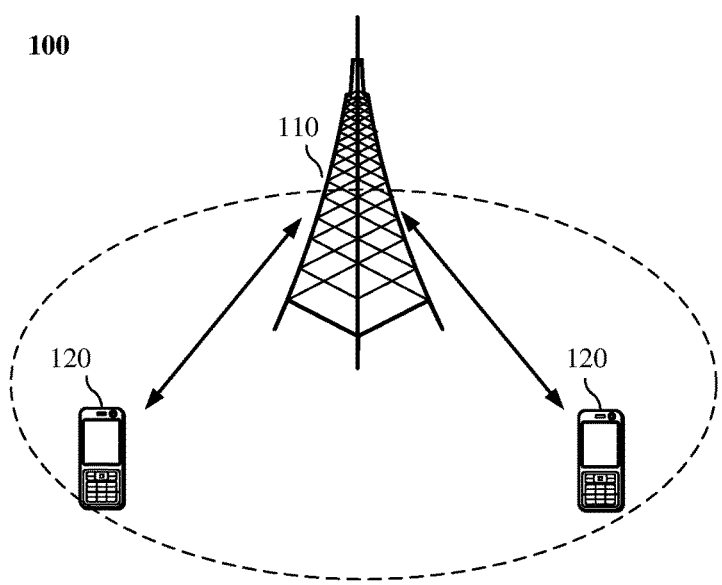
FIG. 1A is a first schematic diagram of a communication system architecture according to an embodiment of the disclosure.

The communication system 100 to which embodiments of the disclosure are applied may be shown in FIG. 1A. The communication system 100 may include a network device 110 which may be a device that communicates with a UE 120 (or referred to as a communication terminal device or a terminal device). The network device 110 may provide communication coverage for a particular geographical area and may communicate with UEs located within the coverage area. Optionally, the network device 110 may be a Base Transceiver Station (BTS) in a GSM system or a CDMA system, a network device (NodeB, NB) in a WCDMA system, an evolved network device (Evolutional Node B, eNB or eNodeB) in an LTE system, or a wireless controller in a Cloud Radio Access Network (CRAN). Alternatively, the network device can be a mobile switching center, a relay station, an access point, an on-board device, a wearable device, a hub, a switch, a bridge, a router, a network-side device in a 5G network or a network device in a future evolved Public Land Mobile Network (PLMN), etc.

The communication system 100 also includes at least one UE 120 located within the coverage area of the network device 110. "UE" as used herein includes, but is not limited to, a device which is configured to receive or send communication signals via wired lines, such as via a Public Switched Telephone Network (PSTN), a Digital Subscriber Line (DSL), a digital cable, a direct cable, and/or, another data connection/network, and/or, wireless interfaces such as wireless interfaces for a cellular network, a Wireless Local Area Network (WLAN), a digital television network such as a Digital Video Broadcasting-Handheld (DVB-H) network, a satellite network, an Amplitude Modulation (AM)-(Frequency Modulation) FM broadcast transmitter, and/or another UE, and/or an Internet of Things (IoT) device. A UE arranged to communicate through a wireless interface may be referred to as a "wireless communication terminal device", a "wireless terminal device" or a "mobile terminal device".

Optionally, Device to Device (D2D) communication may be performed between UEs 120.

In the related art, the neighboring cell measurement behavior of UE in IDLE state and inactive state is constrained by related parameters in a system broadcast message. For example, for an initiation of an intra-frequency measurement, when Srxlev of the serving cell>SIntraSearchP and Squal of the serving cell>SIntraSearchQ, the intra-frequency neighboring cell measurement is not initiated; otherwise, the intra-frequency neighboring cell measurement is initiated. For the inter-frequency measurement of the same priority or a lower priority, when Srxlev of the serving cell>SnonIntraSearchP and Squal of the serving cell>SnonIntraSearchQ, the inter-frequency measurement of the same priority or the lower priority is not initiated; otherwise, the inter-frequency measurement of the same priority or the lower priority is initiated. For inter-frequency measurement of a higher priority, the measurement is always initiated.

System message SIB1 and network assistance message NS (network signaling): when entering into a new cell, the terminal may use the stored SI, and identify whether the stored SI is valid through Area ID and ValueTag. If the stored SI fails, the SI is obtained through the normal process.

The main measurement reference signals include new radio-synchronizing signal and physical broadcast channel (PBCH) block (NR-SSB) and/or channel state indication-reference signal (CSI-RS).

The measurement report includes cell-level measurements such as reference signal receiving power (RSRP)/reference signal receiving quality (RSRQ) of a primary cell and a secondary cell.

The measurement report includes a white list and a black list for the cell.

Measurement reporting triggered by events A1-A6 is supported.

Figure 1B:
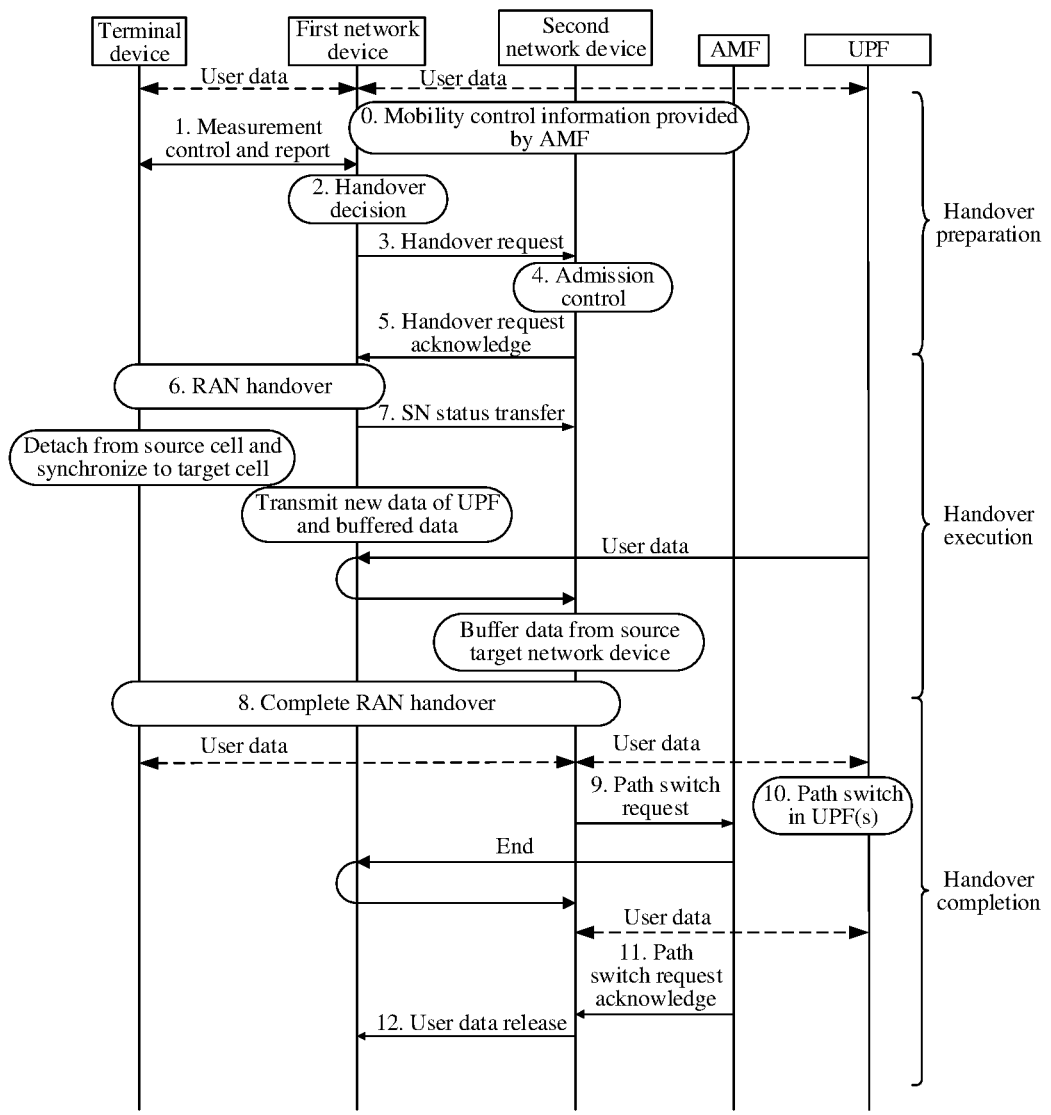
FIG. 1B is a schematic diagram of a handover process.

Handover process is as follows: with reference to FIG. 1B, focusing on operations 0 and 1, measurement and reporting before handover.

It should be understood that the terms "system" and "network" are often used interchangeably herein. In this context, the term "and/or" is merely an association relationship that describes associated objects, indicating that three relationships may exist, for example, A and/or B, which may indicate that there are three situations: A exists alone, A and B exist at the same time and B exists alone. In addition, the character "/" herein generally indicates that the related objects have a relationship of "or".

In order to enable a more detailed understanding of the features and technical contents of the embodiments of the disclosure, the implementation of the embodiments of the disclosure will be described in detail below in conjunction with the accompanying drawings. The drawings are provided for illustration only and are not intended to limit the embodiments of the disclosure.

Figure 2:
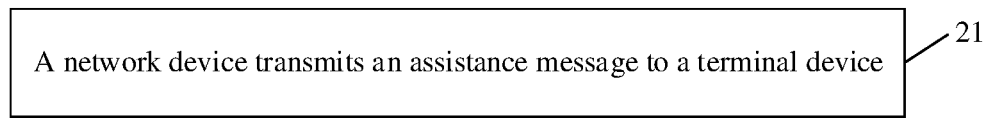
FIG. 2 is a first flowchart of a method for measurement control according to an embodiment of the disclosure.

An embodiment of the disclosure provides a method for measurement control, as illustrated in FIG. 2, the method includes the following operation.

At block 21, the network device transmits an assistance message to a terminal device, the assistance message is used for adjusting a mobility measurement behavior of the terminal device.

Accordingly, a method for measurement control is also provided at a terminal device side, as illustrated in FIG. 3, the method includes the following operation.

At block 31, the terminal device receives an assistance message from a network device, the assistance message is used for adjusting a mobility measurement behavior of the terminal device.

The assistance message indicates at least one of the following:
a measurement frequency;
a measurement type to be enabled or disabled; or
adjusting a measurement time.

In the related art, such as in LTE, it is possible to determine, according to the capability of the terminal device, whether to perform a process of reducing frequencies or disable measurements for the terminal device. The capability of the terminal device may be a capability of the terminal device to report whether such enhancement is supported (such as true or false). If it supports the enhancement, the aforementioned process may be performed, and otherwise, the process may not be performed. And the specific processing is preset in the protocol. Moreover, this processing method is mainly applied to a High Speed Train (HST) scenario.

Different from the aforementioned related art, in the present embodiment, the measurement control is performed by transmitting the assistance message, thus making the configuration more flexible. Moreover, the solution provided by the embodiment of the disclosure can be applied to a terminal device in the following scenarios: a terminal in the HST scenario that allows fast movement on a fixed mobile line; a customer premise equipment (CPE) with a high power class; a vehicle-mounted mobile terminal in V2X scenarios; an Internet of Things (IoT) terminal. It should be understood that only the above-mentioned scenarios are illustrated herein but it does not mean that the embodiments of the disclosure can only be used for the above-mentioned scenarios and other scenarios can also be applied but are not exhaustive herein.

The aforementioned terminal device may be a terminal device in any one of an idle state, an inactive state, or a radio resource control (RRC) connected state.

Figure 4:
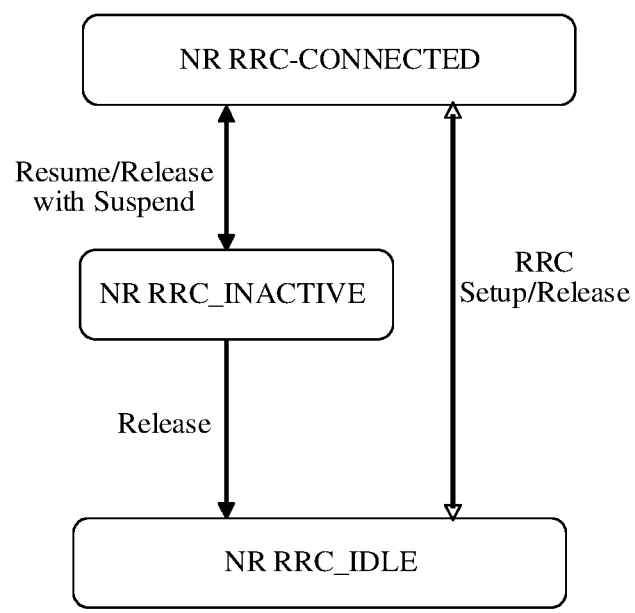
FIG. 4 is a schematic diagram of a user equipment (UE) state transition.

The state transition of the terminal device can be controlled by the network device, as shown in FIG. 4.

RRC_CONNECTED (a Connected State), characterized by having an RRC connection, being able to transmit and receive data, supporting handover, the network storing a context of a terminal, and the network knowing a serving cell of the terminal.

RRC_IDLE (an idle state), characterized by Public Land Mobile Network (PLMN) selection, cell selection/cell reselection, paging, system information reception, etc.

RRC_INACTIVE (an inactive state), characterized by cell reselection, paging, system information reception, the network having a terminal context, the network knowing a radio access network (RAN) area (AREA) where the terminal is located.

In the solution provided by the embodiment, the network device utilizes the assistance message to enable the terminal device to realize "early measurement established through fast carrier aggregation (CA) or dual connectivity (DC)" or "early measurement reporting (EMR) of early switching measurement" more quickly and with more power saving.

Firstly, dimensions corresponding to a generation of assistant messages are described as follows.

The network device generates M assistance messages; M is an integer greater than or equal to 1; among the M assistance messages, information related to different assistance messages is different.

Information related to the assistance message includes at least one of:
a frequency band corresponding to the assistance message, a terminal device corresponding to the assistance message, a terminal device group corresponding to the assistance message, a terminal device type corresponding to the assistance message, a terminal power class corresponding to the assistance message, a cell group corresponding to the assistance message, an area corresponding to the assistance message, or a time period corresponding to the assistance message.

That is, the information related to any two assistance messages is different.

The information related to the assistance message can be one or more of the above.

The classification manner of the aforementioned terminal device group may include a location of the terminal device, a service type declared by the terminal, an identifier of the terminal (such as an ID of the terminal), and so on. For the identifier of the terminal, for example, there can be a terminal device group composed of some special IDs and a terminal device group composed of non-special IDs, etc. Of course, different terminal device groups can be obtained in other dividing manners based on IDs of terminals.

Terminal device types may include an IoT terminal type, an augmented reality (AR) terminal type, a virtual reality (VR) terminal type and the like.

The power classes of terminal devices can be divided according to different powers. For example, the terminal devices can be divided into high-power terminal devices and low-power terminal devices. It is also possible to divide the terminal devices with high, medium and low power classes, which will not be exhaustive here.

For example, information related to the assistance message can be a frequency band, and each of the generated M assistance messages corresponds to a different frequency band.

The information related to the assistance message can be the terminal device, and each of the M assistance messages is for a different terminal device. It should be noted here that, it is not necessary to generate corresponding assistance messages for all terminal devices (or all terminal devices managed by the network device, or all terminal devices within the coverage area of the network device), and assistance messages can be generated only for one or more of the terminal devices according to the actual situation.

The information related to the assistance message may be a terminal device group, and a respective assistance message is generated for each of multiple terminal device groups.

Alternatively, the information related to the assistance message can be the area plus the time period, that is, different assistance messages can be generated for different areas during different time periods.

Alternatively, the information related to the assistance message can be the area plus the time period plus the frequency band, and different assistance messages are generated in different areas, different time periods and different frequency bands, respectively.

Alternatively, the information related to the assistance message can be the cell group plus the terminal device type, that is, corresponding assistance messages are generated for some terminal device types in different cell groups.

No exhaustive description is made here, and multiple corresponding different assistance messages can be generated as long as one or more pieces of the information related to the assistance message are described above.

Again, the signaling for transmitting assistance messages is described as follows.

The assistance message is carried by a master information block (MIB), a system information block (SIB), a downlink control information (DCI), or a radio resource control (RRC) signaling.

Specifically, the assistance message is carried by the MIB, which is transmitted periodically in the time domain, and the period of the MIB can be 40 ms (of course, it may be set to be longer or shorter, which is only illustrated here), and all MIB messages are transmitted in corresponding subframes. That is, the assistance message can be considered to be transmitted by broadcasting a system message to the terminal device or by multicasting a system message to the terminal devices. The terminal device can obtain the assistance message carried by the MIB from the MIB in the system message.

The assistance message can be set in a certain field of MIB, for example, it can be set in a reserved bit.

Alternatively, the assistance message may be carried by the system information block (SIB).

Specifically, the assistance message may be carried by a MultiFrequencyBandListNR-SIB (i.e., a multiband list NR-SIB) information element (IE). Alternatively, the assistance message may be carried by a new IE, such as MultiUENR-SIB (i.e., MultiUE NR-SIB).

Further, if MIB or SIB is used to carry the assistance message, it can be as follows.

First Manner

---

"MultiFrequencyBandListNR-SIB:: = SEQUENCE (SIZE
(1.. maxNrofMultiBands)) OF NR-MultiBandInfo
    NR-MultiBandInfo :: = SEQUENCE {
    FreqBandIndicatorNR FreqBandIndicatorNR  OPTIONAL,
    -- Cond OptULNotSIB2
    nr-NS-PmaxList  NR-NS-PmaxList  OPTIONAL -- Need S
        nr-NS-RRM
    }
"

---

It can be understood that in the multiband list NR-SIB, the NR band, the NR power list and its corresponding nr-NS-RRM (i.e., assistance message) are indicated. That is, in the NR band, the corresponding assistance message is indicated.

Alternatively, the contents can be as follows.

Second Manner

```
"MultiUE-SIB :: = SEQUENCE (SIZE (1.. maxNrofMultiBands))
OF NR-MultiBandInfo NR-UEInfo:: = SEQUENCE {
    Powerclass
    nr-NS-RRM}"
```

In this information format, the corresponding power class and nr-NS-RRM (that is, assistance message) can be set for UE. In this example, it may be understood as an assistance message corresponding to this dimension of the terminal.

The above is only an example for setting the format of the assistance message in SIB. Thus, only the format examples of two assistance messages provided in a first example are provided, but it should be understood that other new IEs can actually be set to indicate more assistance messages corresponding to relevant information, for example, setting IEs corresponding to area dimension, in which the existence of assistance messages can be defined, and so on. No more exhaustive descriptions will be made here.

Alternatively, the assistance message can be carried by downlink control information (DCI). The assistance message can be defined as a field set in one of multiple formats of DCI, and can be realized by adding a field in the format. Alternatively, a new DCI format may be introduced for transmitting the assistance message. No more exhaustive descriptions will be made in this example.

Here, carrying the assistance message by DCI is different from carrying the assistance message by MIB or SIB in that when the measurement strategy of UE needs to be adjusted, it is realized by sending DCI carrying the assistance message to the terminal device in time.

Alternatively, the assistance message can be carried in RRC signaling.

Based on the foregoing description, no matter what type of information related to the assistance message, the specific content contained in the assistance message can indicate at least one of the following: a measurement frequency; a measurement type to be enabled or disabled; or adjusting a measurement time.

It should be noted that the assistance message can contain at least one of the above contents, which means that the assistance message can indicate the deletion of measurement frequencies and a part of measurement types to be disabled at the same time; or, which means that the assistance message can indicate the modification of a measurement frequency and the shorten of the measurement time corresponding to the measurement frequency at the same time. There can be other combinations, which are not exhaustive in this example.

The assistance message may include: a serial number representing at least one set of measurement frequencies to be modified or deleted; or, a serial number representing at least one measurement object to be modified or deleted. The measurement object contains the measurement frequency.

Here, the measurement object may contain a variety of contents, such as a measurement frequency, a GAP, a measured reference signal, etc. In this example, only the measurement frequency is concerned, and thus other contents will not be elaborated herein.

A serial number or a sequence number contained in the assistance message can be understood as a measurement frequency corresponding to the serial number or the sequence number contained in the assistance message; or, the serial number (or sequence number) contained in the assistance message can be understood as a certain measurement object. For example, similar to the nr-NS-PmaxList in the current NR SIB1 system message, the assistance message includes a serial number nr-NS-RRM of a set of measurement objects (MOs), which are used for configuring the measurement objects to be modified/deleted in the MO list of UE; or, the assistance message includes a serial number nr-NS-RRM of a set of measurement frequencies, and the serial number is used for configuring the measurement frequencies to be modified/deleted of the UE.

For another example, the assistance message can be set by a frequency band. In combination with MultiFrequencyBandListNR-SIB in the previous first manner, it can be seen from Table 1 that if 0 is written in the position of the field nr-NS-RRM in the assistance message, such as SIB, it means that the UE measures NS-1.

TABLE 1

| NR band | Value of nr-NS-RRM |||||||| 
|---|---|---|---|---|---|---|---|
| | 0 | 1 | 2 | 3 | 4 | 5 | 6 | 7 |
| n1 | NS_01 | NS_02 | NS_03 | NS_04 | NS_05 | | | |
| n2 | NS_01 | NS_02 | NS_03 | | | | | |
| n78 | | NS_02 | NS_03 | | | | | |

For another example, the assistance message may include a terminal device type. With reference to table 2, the terminal device type and its corresponding nr-NS-RRM value are set in the SIB in the second manner of the example 2.

TABLE 2

| UE type | Value of nr-NS-RRM |||||||| 
|---|---|---|---|---|---|---|---|
| | 0 | 1 | 2 | 3 | 4 | 5 | 6 | 7 |
| 1 | NS_01 | NS_02 | NS_03 | NS_04 | NS_05 | | | |
| 2 | NS_01 | NS_02 | NS_03 | | | | | |
| 3 | | NS_02 | NS_03 | | | | | |

Note:
The UE type may include a power class, a cell group, a cell, an area, a transmission time period, etc. The information related to any of the aforementioned assistance messages can be used in this table, and will not be listed one by one.

Further, in the above two tables, the corresponding relationships between the values of nr-NS-RRM and frequencies can be seen in Table 3; and the corresponding relationships between the values of nr-NS-RRM and the measurement objects can be seen in Table 4.

TABLE 3

| | Frequency list |
|---|---|
| NS_01 | F1 |
| NS_02 | F1 + F2 (Frequencies with higher priorities) |
| NS_03 | F1 + F2 + F3 |
| NS_04 | F2 + F3 + F4 |
| NS_05 | F1 + F2 + F4 |
| NS_06 | F1 + F2 + F3 + F4 |

TABLE 4

| | MO list |
|---|---|
| NS_01 | MO1 |
| NS_02 | MO 1 + 2 |

TABLE 4-continued

| | MO list |
|---|---|
| NS_03 | MO 1 + 2 + 3 |
| NS_04 | MO 1 + 2 + 3 + 4 |

It should be noted that, in one case, only serial numbers of measurement frequencies or serial numbers of measurement objects may be included in the assistance message. Whether to delete or modify a measurement frequency or a measurement object can be determined in conjunction with an indication of other information or in conjunction with a preset rule. For example, a rule for pre-configuring the terminal device and the network device is that the measurement frequencies (or the measurement objects) contained in the assistance message are contents to be deleted, or frequencies that need to be modified to be measurement frequencies included in the assistance message or the frequencies corresponding to the measurement objects. For another example, it may be indicated in conjunction with other information whether to delete or modify the measurement frequencies or measurement objects contained in the assistance message. For example, it may be indicated through DCI to delete the frequencies indicated in the assistance message, and so on, which will not be elaborated herein.

In another case, the assistance message may include not only a serial number of a measurement frequency or a serial number of a measurement object, but also a deletion of a measurement frequency, or a modification of a measurement frequency, or a deletion of a measurement object, or a modification of a measurement object.

For a measurement type to be enabled or disabled, the assistance message may include an indication for enabling at least one measurement type, or an indication for disabling at least one measurement type.

For example, an assistance message can be an indication with a length of 1 bit. When the assistance message is a first value (for example, 1), it is determined to enable a measurement of a certain measurement type, and when the assistance message is a second value (for example, 0), it is determined to disable a measurement of a certain measurement type.

For example, the measurement types may include two kinds of measurements, i.e., an inter-frequency cell measurement and an intra-frequency cell measurement. When the assistance message indicates "1", which means that the inter-frequency cell measurement is enabled, and when the assistance message indicates "0", which means that the inter-frequency cell measurement is disabled. Alternatively, a value of the bit in the assistance message can be set to 1 to indicate that the serving cell and the intra-frequency cell measurement and inter-frequency cell measurement are enabled, and the value of the bit in the assistance message can be set to 0 to indicate that the inter-frequency cell measurement are disabled.

In addition to the aforementioned manner, the division of the measurement types can also be made based on different secondary cell groups, different radio access technologies (RATs), such as 5G and 4G, different positioning functions, different time-frequency synchronization functions, such as inter-frequency reference signal time difference (RSTD) and so on. No more exhaustive descriptions will be made in this example.

It should be noted that, when three or more measurement types are obtained through division, the enable or disable of the different measurement types can be configured flexibly through an assistance message with multiple bits. In this case, certain rules can be set in advance by the network device and the terminal device. For example, a first bit corresponds to an indication for enabling or disabling a first measurement type, a second bit corresponds to an indication for enabling or disabling a second measurement type, and a third bit corresponds to an indication for enabling or disabling a third measurement type. The rule may also be preset to enable when the bit value is 1 and disable when the bit value is 0.

For adjusting the measurement time (for example, it may be to prolong or shorten the measurement time), the assistance message may also include one of the following information: a scaling factor of the measurement time; a changed value of a number of times for measuring a measurement sample in the measurement time; or an indication for adjusting a running state of a timer. Here, a timer corresponding to measurement is used for controlling the measurement time.

The indication for adjusting the running state of the timer includes: an indication for starting a terminal timer; an indication for stopping a terminal timer; or an indication for pausing a terminal timer.

Specifically, the assistance message can be a single variable for indicating the scaling factor. The scaling factor may be greater than 1 or less than 1. The scaling factor of the measurement time can be used to prolong or shorten a duration of the timer (or the measurement time) corresponding to the measurement.

For example, the timer corresponding to the measurement can be a T331 timer. The T331 timer will be started before early measurement reporting (EMR) for UE in the idle state, and frequencies of all configured serving cells and neighboring cells are measured before the timer expires, including detection, evaluation and measurement. The assistance message indicates the measurement time or the scaling factor of the T331 timer.

For example, Scale factor=0.5 means that within 0.5*T331, the network configures the specified UE through the assistance message to stop the measurement in advance. Alternatively, if the measurement time is to be prolonged, Scale factor=1.5 may be set, and the corresponding measurement time becomes 1.5*T331.

For another example, Scale factor=0.5 represents 0.5*the measurement time, where the measurement time is given in protocol TS38.133 (representing the total time of N sampling points), and the network configures the specified UE through the assistance message to stop the measurement in advance. Alternatively, when Scale factor=2, the measurement time becomes 2*the measurement time.

Alternatively, it may be an int-type value. Of course, if a timer is indicated to be stopped, an indication of 1 bit may also be provided. For example, when a value of the bit is set to be 1, it indicates that the timer is enabled and usable, and when the value of the bit is set to be 0, the timer is disabled.

The changed value of a number of times for measuring a measurement sample in the measurement time may be, in particular, an integer value set in the assistance message. The integer value indicates a changed value of the number of times of measurement for measuring a measurement sample in a measurement window. For example, if 10 measurements are required for the original setting in a measurement window, and the value of 5 is set in the assistance message, then the next 5 measurements can be stopped. If the assistance message indicates a value of 6, it can be considered that 6 measurements are performed on the measurement sample within the measurement time.

The indication for adjusting the running state of the timer may include: starting, stopping or pausing the timer.

An indication of 1 bit in the assistance message may be provided. For example, 1 indicates to start the timer and 0 indicates to stop the timer. The timer corresponding to the measurement can be considered as the T331 timer. If the assistance message indicates 0, the T331 timer may not be started, and accordingly, the terminal device does not perform the measurement. More specifically, if the assistance message is sent (for example, broadcasting through MIB or SIB) when the terminal device does not perform the measurement, the terminal device can consider that no measurement is needed. If the terminal device has started the measurement and started the corresponding T331 timer, sending the assistance message (for example, sending the assistance message through DCI) can be regarded as instructing the terminal device to stop the timer immediately and end the measurement. Alternatively, an indication of 2 bits may be provided. For example, if values of the 2 bits are "00", it is indicated to stop the T331 timer; if the values of the 2 bits are "01", it is indicated to start the timer; and if the values of the 2 bits are "11", it is indicated to pause the timer. The difference between pausing the timer and stopping (turning off) the timer can be understood as follows: when the timer is paused, the timer is stopped at the current timing duration, and the timer may continue to time once it is restarted; and when the timer is stopped (turned off), it can be understood that the timer is closed directly, and the timing duration returns to 0.

Alternatively, the indication for adjusting the running state of the timer may include an indication to start, stop, or pause a timer for measuring the pause. The timer for measuring the pause can be used to start timing when the measurement is paused until the timing duration of the timer reaches a preset duration. For example, 1 may be set to start and 0 to stop. Alternatively, an indication of 2 bits may be provided. For example, if values of the 2 bits are "00", it is indicated to stop the timer for measuring the pause, if 01 is indicated, it may be considered to indicate that the timer for measuring the pause is started, and if 11 is indicated, it may be considered to indicate that the timer for measuring the pause is paused.

The following is a description of transmitting an assistance message.

First Transmission Manner

The network device transmits the assistance message to the terminal device, including the following operation.

The network device transmits at least part of M assistance messages to the terminal device in response to a first preset condition being satisfied.

The first preset condition includes at least one of the following conditions:
  a current time is in a sending time period or a receiving time period corresponding to the assistance messages; or
  an area where the terminal device is located is a sending area or a receiving area corresponding to the at least part of the assistance messages.

Here, the sending time period can be understood as determining whether the current time falls within the sending time period based on the transmission time on the network device side, and if so, the network device determines that a part of the assistance messages can be transmitted. The receiving time period is based on the time when the network device predicts that the terminal device receives the assistance message. If the current time falls within the receiving time period when the terminal device predicts that the terminal device receives the assistance message, the part of the assistance messages can be transmitted.

Second Transmission Manner

The network device transmits the assistance message to the terminal device, including the following operation.

The network device broadcasts or multicasts a respective assistance message corresponding to each area to at least one device in the area among at least one area within a coverage of the network device. The at least one device includes the terminal device.

Third Transmission Manner

The network device transmits the assistance message to the terminal device, including the following operation.

The network device determines to transmit a corresponding assistance message to the terminal device based on information related to the terminal device.

The information related to the terminal device includes at least one of the following:
  a type of the terminal device, a power class of the terminal device, a position where the terminal device is located, a terminal device group to which the terminal device belongs, a cell group corresponding to the position where the terminal device is located, a frequency used by the terminal device, or an identifier of the terminal device.

The difference between the first and second transmission manners is that the first transmission manner distinguishes the assistance messages transmitted by the network device according to time and/or area, that is, different assistance messages may be transmitted at different times, or assistance messages can be transmitted to terminal devices entering a certain area at the same time. This implementation can be considered that the assistance message is pre-configured. Depending on the known moving trajectory of the terminal, the network automatically triggers an update of the assistance message according to a position and/or time point, for configuring the measurement frequency list, measurement types or measurement time requirements of the terminal (the specific contents are as before, which will not be elaborated herein).

The second transmission manner does not distinguish the time, and the network device divides its own coverage into one or more areas, and different areas correspond to different assistance messages. Whether the terminal device enters any area or not, the network device transmits different assistance messages in different areas. In this manner, the assistance messages are broadcast messages or multicast messages flexibly configured by the network and carried in SIB or other messages.

The third transmission manner is different from the previous first and second transmission manners in that, the third transmission manner pays more attention to the information of terminal device. For example, if the terminal device is of a certain type, an assistance message corresponding to this type is transmitted to the terminal device; if the power class of the terminal device is a certain power class, the assistance message corresponding to the power class is transmitted to the terminal device, or depending on the frequency used by the terminal device, if it is set that different assistance messages correspond to different frequency bands, a assistance message corresponding to a frequency band in which the frequency used by the terminal device falls is determined according to the frequency used by the terminal device. Of course, in connection with the above-mentioned description of information related to the terminal device in the third transmission manner, there may be more cases which will not be exhaustive here.

In the third transmission manner, the information related to the terminal device may be information preset by the network device, and then, when the network device detects that the terminal device is within its coverage area, the preset information related to the terminal device may be extracted, and the corresponding assistance message can be determined to be transmitted to the terminal device. Alternatively, the terminal device may transmit the information related to the terminal device to the network device, and the network device determines to transmit the corresponding assistance message to the terminal device according to the received information related to the terminal device.

It should also be noted that in the aforementioned manners, the network device can be a base station on the network side or a relay device on the network side. When the network device is a relay on the network side, at least one assistance message can be obtained from the base station in advance, and then the relay can determine whether to transmit the corresponding assistance message to the terminal device based on the aforementioned manners. Alternatively, the relay may itself generate one or more assistance messages to be transmitted to terminal devices within its coverage area.

The terminal device performs at least one of the following processes based on the assistance message transmitted by the network device:

after modifying at least one set of measurement frequencies, performing a measurement based on the modified measurement frequencies; or performing a measurement on remaining measurement frequencies after deleting measurement frequencies;

enabling a measurement corresponding to at least one measurement type;

disabling a measurement corresponding to at least one measurement type and performing a measurement according to the remaining measurement types; or performing a measurement based on a changed measurement time.

The measurement based on the changed measurement time includes the following operations:

prolonging or shortening a measurement time by using a scaling factor of the measurement time, and performing a measurement by using the prolonged or shortened measurement time;

determining a number of times for measuring a measurement sample by using a changed value of a number of times for measuring the measurement sample in a measurement time, and performing a measurement based on the determined number of times; and adjusting a running state of a timer based on an indication for adjusting the running state of the timer, and performing a measurement under a control of the adjusted running state of the timer.

Adjusting the running state of the timer based on the indication for adjusting the running state of the timer, and performing the measurement under the control of the adjusted running state of the timer includes one of the following operations:

determining to stop a terminal timer based on an indication for stopping a terminal timer, and stopping the measurement;

determining to start a terminal timer based on an indication for starting the terminal timer, and starting the measurement; or determining to pause a terminal timer based on an indication for pausing the terminal timer, and stopping the measurement.

It should be noted that how the terminal device determines the specific content contained in the assistance message and performs the corresponding processing has been described in the foregoing embodiments and therefore the description will not be repeated here.

In a fourth transmission manner, the network device broadcasts or multicasts the assistance message to the terminal device managed by itself regardless of the current situation of the terminal device. In this case, the terminal device determines, according to its own situation, whether to perform a measurement based on the assistance message.

Specifically, the terminal device performs the measurement based on the assistance message when a second preset condition is satisfied.

The second preset condition includes at least one of the following conditions:

a frequency band used by the terminal device is a frequency band corresponding to the assistance message;

the terminal device is a terminal device indicated by the assistance message;

a terminal device group to which the terminal device belongs is a terminal device group corresponding to the assistance message;

a type of the terminal device is a terminal device type corresponding to the assistance message;

a power class of the terminal device is a terminal power class corresponding to the assistance message;

a cell group where the terminal device is located is a cell group corresponding to the assistance message; or a position where the terminal device is located is in a measurement area corresponding to the assistance message. Here, it should be noted that the measurement area may be an area included in the assistance message, which may be the same as or different from the sending area. The sending area focuses on controlling what kind of assistance message can be transmitted at what position, or controlling whether or not the corresponding assistance message can be transmitted at what position. Here, the measurement area means that the terminal device indicated in the assistance message can be adjusted and then measured in some areas according to the assistance message, while in some areas, it is not needed.

A current time is a measurement time period corresponding to the assistance message. The measurement time period and the sending time period in the foregoing embodiment can be the same or different. The sending time period refers to a time period in which the assistance message is transmitted. Here, the measurement time period refers to a time period indicated by the assistance message for measurement. Once the terminal device determines that the measurement time period is satisfied, the measurement frequency (and/or measurement type and/or measurement time) can be adjusted based on the assistance message, and then the measurement can be performed.

There is also a fifth transmission manner, the terminal device transmits the assistance message to another terminal device satisfying a third preset condition.

The third preset condition includes at least one of the following conditions:

a frequency band used by the another terminal device is a frequency band corresponding to the assistance message;

the another terminal device is a terminal device indicated by the assistance message;

a terminal device group to which the another terminal device belongs is a terminal device group corresponding to the assistance message;

a type of the another terminal device is a terminal device type corresponding to the assistance message;

a power class of the another terminal device is a terminal power class corresponding to the assistance message;

a cell group where the another terminal device is located is a cell group corresponding to the assistance message;

a position where the another terminal device is located is in a measurement area corresponding to the assistance message; or a current time is in a measurement time period corresponding to the assistance message.

This means that the terminal device may act as a transmission node and transmit an assistance message to other terminals to which it is connected. It should be understood that the terminal device can directly transmit the assistance message to other terminal devices without judging the situation of other terminal devices, and other terminals themselves can judge whether the assistance message is applicable or not. Alternatively, the terminal device may obtain the information related to other terminal devices in advance, and judge whether to transmit corresponding assistance message to the other terminal devices according to the information related to the other terminal devices, that is the processing provided by this manner.

With reference to the foregoing transmission manners, the following describes them by way of example.

Processes performed by adopting the first transmission manner are as follows.

In a first example, one of the M assistance messages is specified to be transmitted in an area A, and the assistance message is transmitted when the current area is the area A.

In a second example, in the M assistance messages, the assistance message 1 corresponds to the sending time period 1 and the assistance message 2 corresponds to the sending time period 2, and when the current time is in the sending time period 1, the network device transmits the assistance message 1 to all the terminal devices in the coverage area.

In a third example, if a list of measurement frequencies is known, the assistance message is set to be transmitted in the transmission period 1 of the area A, and the terminal device can be notified to delete or modify the measurement frequencies through the assistance message when it is determined that the condition is met. The terminal device can also be notified through an assistance message to disable the measurement type A, and the value of the number of times for performing the measurement corresponding measurement time is adjusted to C.

In a fourth example, it is assumed that three measurement types are divided, which are a serving cell measurement, an intra-frequency measurement and an inter-frequency measurement. The assistance message indicates that inter-frequency measurement is not supported, and the sending area corresponding to the assistance message is B and the sending time period corresponding to the assistance message is the sending time period 2, then, when it is predicted that the terminal device enters the area B and the current time is within the sending time period 2, the terminal device is instructed through the assistance message not to perform the inter-frequency measurement.

In a fifth example, by default, for the case where early measurement reporting (EMR) is required, the network pre-configures a scaling factor of the measurement time to those terminals that need to shorten the measurement time through the assistance message to be 0.5, then the assistance message can be transmitted to all terminal devices that perform EMR at the corresponding time.

In a sixth example, three measurement types are divided, which are a serving cell measurement, an intra-frequency measurement and an inter-frequency measurement. The assistance message indicates that inter-frequency measurement is not supported, and the transmission area corresponding to the assistance message is B and the sending time period corresponding to the assistance message is the sending time period 2; then, when it is predicted that the terminal device enters the area B and the current time is within the sending time period 2, the terminal device is instructed not to perform the intra-frequency measurement through an assistance message. Further, the assistance message may also include measurement frequencies to be deleted, and the terminal device removes the corresponding measurement frequencies contained in the remaining types according to the assistance message and measures the remaining measurement frequencies.

The following is a process in which the second transmission manner is adopted, that is, the network device broadcasts or multicasts a respective assistance message corresponding to each of at least one area in the coverage area to the terminal device in the area.

In a seventh example, the network updates or configures the network assistance message to the terminal device based on the actual trajectory or location of the mobile user according to the geographical area where the terminal device of the user is located.

For example, in a scene of a high-speed rail, the trajectory of train and terminal user is fixed and known, and the base stations along the line can adjust the broadcast assistance messages to the passing terminal device in real time.

A certain terminal device or each of a batch of terminal devices receiving an assistance message can obtain a frequency to be measured in advance, or obtain a measurement type to be disabled in advance, or adjust the measurement time, etc. through the assistance message.

In an eighth example, in an Internet of Vehicles scenario, the network assistance message is notified to the terminal device through broadcast or multicast.

In one manner, the network device (such as the base station) notifies all terminals within the coverage, and the terminals adjust their behavior according to the network assistance message. In one manner, the base station notifies a part of the terminals (i.e., a group of terminals) in the area according to the geographical area, and the group of terminals adjusts their behavior according to the assistance message.

Figure 5:
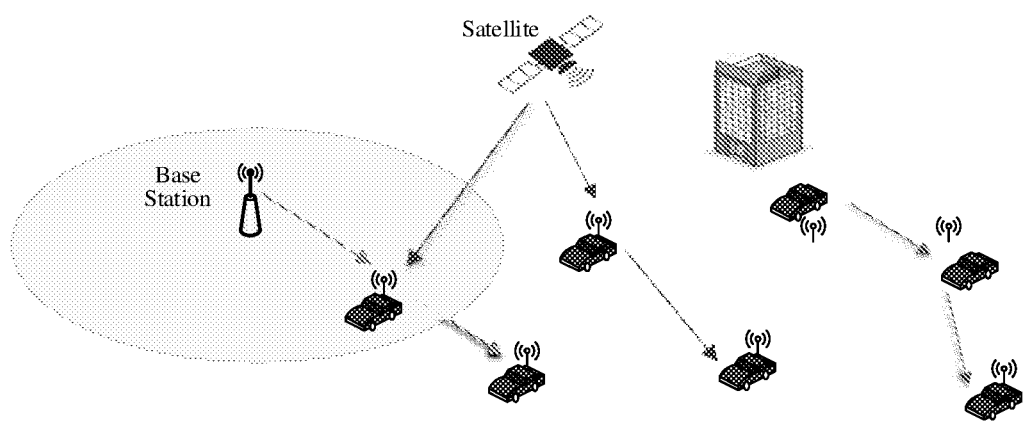
FIG. 5 is a schematic diagram of a scenario according to an embodiment of the disclosure.

When the terminal device receives the assistance message, for example, with reference to FIG. 5, when the terminal device is out of coverage, Out of Coverage (OOC): GNSS UE, the terminal device receives the assistance message from the network device 1 (that is, the satellite in the FIG. 5). When the terminal device is within the coverage area of the network device, in coverage (IC): {GNSS, eNB}>UE, that is to say, the terminal device synchronizes with the satellite preferentially, and correspondingly, the terminal device receives the assistance message transmitted by the satellite preferentially. The priority of selecting GNSS or eNB is configurable, and the priority of GNSS or BS is determined by the scheduling of the base station.

More specifically, for example, for a vehicle-mounted terminal entering area 1 (traffic light), the assistance message 1 may be broadcast or multicast; for a vehicle-mounted terminal entering the area 2 (high-speed speed measuring area), the assistance message 2 may be broadcast or multicast; for a vehicle-mounted terminal entering area 3 (ETC Vehicle Toll Channel), the assistance message 3 may be broadcast or multicast. The assistance messages 1, 2, 3 contain at least one of the contents that can be included in the assistance message mentioned in the foregoing embodiments, but the specific information is different. For example, the assistance message 1 contains a measurement frequency 1 to be deleted, the assistance message 2 contains a measurement type A to be disabled, and the assistance message 3 contains a measurement timer T331 to be disabled, etc., which will not be exhaustive here.

In a ninth example, an example of process performed by using the third transmission manner is illustrated.

For example, according to the terminal type of users, the network configures different network assistance messages for users with different transmission power classes.

Figure 6:
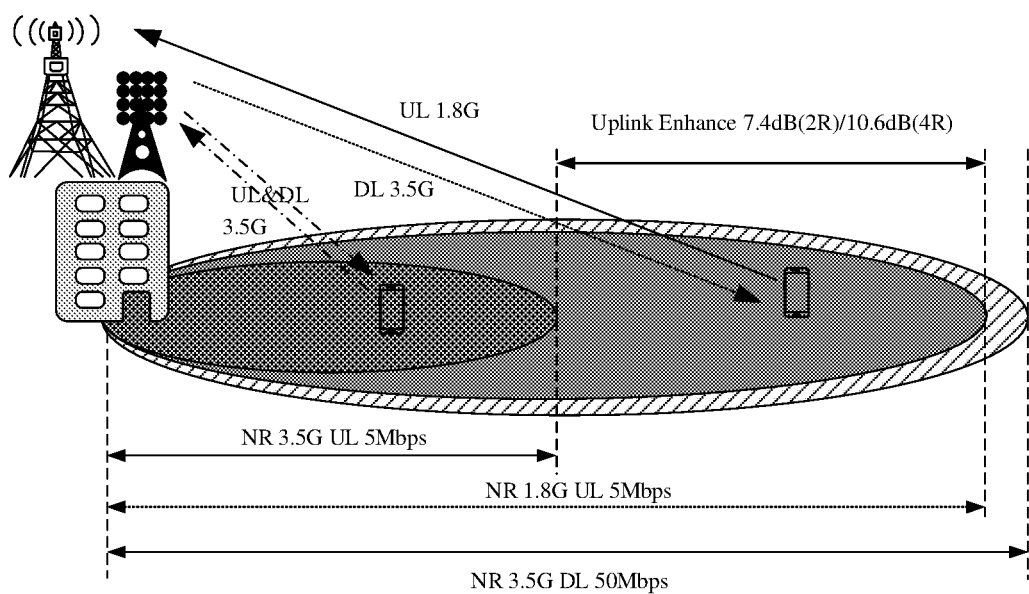
FIG. 6 is a schematic diagram of a scenario according to an embodiment of the disclosure.

For example, as shown in FIG. 6, for a UE with PC (power class) 2, because of its high power class, large transmission power and large corresponding uplink coverage, the network configures and updates the measurement frequencies for this type of user, and the frequency list includes more medium and high frequencies (the signal path loss is large and the downlink coverage is poor), so as to perform downlink measurement in advance, quickly access some medium and high frequency cells, and adopt the communication manner that the downlink is medium and high frequency 3.5 GHz and the uplink is low frequency 1.8 GHz. It's assistance message contains contents of modifying the measurement frequencies.

For a UE with PC (power class) 1, because it has little mobility, the network only configures serving cell type measurements for that type of user. For example, an assistance message is used to inform the terminal device with PC1 to enable the measurement type A.

For another example, for an Internet of Things terminal, such as a smart watch with a SIM card, if it enters the stadium runway (that is, the location of terminal device), the network device configures, for a user of this type according to a type of the terminal device and a location of the terminal device, assistance messages corresponding to the type and an area in which the location is located. For example, the network device may notify the terminal device through an assistance message that a scaling factor of the measurement time is set to be 0.5.

For a terminal configured with an assistance message, the configuration and operation manner thereof will be changed or updated in the above manner. For a terminal that is not configured with the assistance message, they still work in the original configuration manner.

It should be noted that only the information related to some terminal devices is explained in this example, and more processing may actually exist. For example, for a VR-type terminal, when the network device detects that the terminal is within the coverage range, it can control the terminal to disable measuring through an assistance message, and so on.

In a tenth example, the terminal device receives multiple assistance messages transmitted by the network device, and determines to adopt some of the assistance messages based on the current state of the terminal device.

For example, N assistance messages are determined to be adopted according to the terminal device group in which the terminal device is located; then, according to the measurement time period corresponding to one of the assistance messages into which the current time falls, then the assistance message is used for subsequent measurement control.

Specifically, it is assumed that it is set in the assistance message that the terminal device is adjusted to some measurement frequencies for measurement, and the assistance message also indicates to change the measurement time; then the terminal device determines the measurement frequencies to be measured based on the assistance message, and can adjust the measurement time according to the scaling factor, and perform the measurement based on the adjusted measurement time and the corresponding measurement frequencies.

In a eleventh example, a terminal device 1 and a terminal device 2 establish a communication connection, and multiple assistance messages are received by the terminal device 1; it is determined whether a corresponding assistance message exists based on information related to the terminal device 2, such as a cell group to which the terminal device 1 belongs, and if yes, the corresponding assistance message is transmitted to the terminal device 2. It is also possible to determine whether the location of the terminal device 2 is within the sending area or the receiving area of the assistance message in combination with the location of the terminal device 2, and if yes, the assistance message is transmitted to the terminal device 2.

In the related art, in many scenarios, such as high-speed rail HST, Internet of Vehicles, etc., there are a lot of optimization spaces for mobility measurements due to the special requirements of communication scenarios. For example, in the application scenarios of the Internet of Vehicles, the application scenarios and communication requirements are different for different traffic roads/locations. Therefore, it is necessary to optimize the communication of some terminal groups according to classification manner such as geographical location or terminal type. If the network assistance message can be used to support "power saving mode measurement" or "early measurement reporting)" for UE in Idle state or inactive state, unnecessary long-term measurement can be avoided, and the purpose of faster measurement and more power saving can be achieved. In high-speed rail scenario: special sections such as tunnels and bridges etc., there is a possibility of communication optimization. A passing terminal is notified to not perform unnecessary measurements according to specific routes or specific locations, so as to achieve power savings, such as reducing the measurement frequencies and the measurement types or shorten the measurement time, etc.

This solution mainly solves the problem of how to realize network optimization measurements by means of network assistance messages in personalized application scenarios for diversified terminal types in 5G. For different types of terminals in special scenarios, such as the fast-moving terminals on a fixed mobile line in high speed train (HST), a CPE (Customer Terminal Equipment) with a high power class, a vehicle-mounted terminal, etc., the network (pre-) configures or updates the assistance messages related to measurement for the terminal based on the type of the terminal or the location to which the terminal is entered, so that the UE in idle state or inactive state can support "early measurement of fast CAs or DCs" or "early measurement reporting (EMR)" more quickly and with less power, thus ensuring the performance of the terminal and improving the mobility robustness.

It can be seen that with the above solution, the network device can control the terminal device to shorten part of the measurement time, and/or disable part of the measurement frequencies, and/or disable part of the measurement types. In this manner, the terminal device can reduce part of measurements in a certain scenario where frequent measurements are not needed, thereby achieving the effect of saving power consumption of the terminal without affecting the use of the terminal device.

Figure 7:
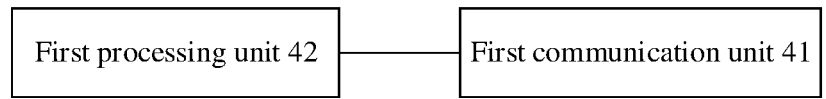
FIG. 7 is a schematic structural diagram of a network device according to an embodiment of the disclosure.

An embodiment of the disclosure provides a network device, as shown in FIG. 7, including a first communication unit 41.

The first communication unit 41 is configured to transmit an assistance message to a terminal device. The assistance message is used for adjusting a mobility measurement behavior of the terminal device.

Correspondingly, the terminal device, as shown in FIG. 8, includes a second communication unit 51.

The second communication unit 51 is configured to receive an assistance message from a network device. The assistance message is used for adjusting a mobility measurement behavior of the terminal device.

The assistance message indicates at least one of:
a measurement frequency;
a measurement type to be enabled or disabled; or
adjusting a measurement time.

According to the embodiment, the measurement control is performed by transmitting an assistance message, so that the configuration is more flexible. Moreover, the solution provided by the embodiment of the disclosure can be applied to a terminal device in the following scenarios: a terminal that allows rapid movement on a fixed mobile line in a high speed train (HST) scenario; customer terminal equipment (CPE) with a high power class; a vehicle mobile terminal in V2X scenario; a terminal in Internet of Things. It should be understood that only the above-mentioned scenarios are illustrated herein but it does not mean that the embodiments of the disclosure can only be used for the above-mentioned scenarios and other scenarios can also be applied but are not exhaustive herein.

The aforementioned terminal device may be a terminal device in any one of an idle state, an inactive state, or an RRC connected state.

First, the dimensions corresponding to the generation of the assistant message are described as follows.

The network device further includes: a first processing unit 42, configured to generate M assistance messages; M is an integer greater than or equal to 1.

Information related to the assistance message includes at least one of:
  a frequency band corresponding to the assistance message, a terminal device corresponding to the assistance message, a terminal device group corresponding to the assistance message, a terminal device type corresponding to the assistance message, a terminal power class corresponding to the assistance message, a cell group corresponding to the assistance message, an area corresponding to the assistance message, or a time period corresponding to the assistance message.

The information related to the assistance message can be one or more of the above.

Again, the signaling for transmitting the assistance message is described as follows.

The assistance message is carried by an MIB, an SIB, a DCI, or an RRC signaling.

Based on the above description, the specific contents contained in the assistance message can be at least one of: a measuring frequency; a measurement type to be enabled or disabled; or adjusting the measurement time.

It should be noted that the assistance message can contain at least one of the above contents, which means that the assistance message can indicate to delete part of the measurement frequencies and disable part of the measurement types at the same time, or, which means that the assistance message can indicate to modify a measurement frequency and shorten the measurement time corresponding to the measurement frequency at the same time. There can be other combinations, which are not exhaustive in this example.

For the measurement frequency, the assistance message may include: a serial number representing at least one set of measurement frequencies to be modified or deleted; or a serial number representing at least one measurement object to be modified or deleted, the measurement object includes the measurement frequency.

For enabling or disabling the measurement type, the assistance message may include an indication for enabling at least one measurement type, or an indication for disabling at least one measurement type.

For changing (e.g., prolonging or shortening) the measurement time, the assistance message may further include one of: a scaling factor of the measurement time, a changed value of a number of times for measuring a measurement sample in the measurement time, or an indication for adjusting a running state of a timer.

The indication for adjusting the running state of the timer includes: an indication for starting a terminal timer; an indication for stopping a terminal timer; or an indication for pausing a terminal timer.

The following is a description of transmitting assistance messages.

First Transmission Manner

The first communication unit 41 transmits an assistance message of the M assistance messages to the terminal device in response to a first preset condition being satisfied.

The first preset condition includes at least one of the following conditions:
  a current time is in a sending time period or a receiving time period corresponding to the assistance message; or
  an area where the terminal device is located is in a sending area or a receiving area corresponding to the assistance message.

Second Transmission Manner

The first communication unit 41 broadcasts or multicasts a respective assistance message corresponding to each of at least one area within a coverage area of the network device to at least one device within the area.

The at least one device includes the terminal device.

Third Transmission Manner

The first communication unit 41 determines to transmit a corresponding assistance message to the terminal device based on the information related to the terminal device.

The information related to the terminal device includes at least one of the following.
  a type of the terminal device, a power class of the terminal device, a position where the terminal device is located, a terminal device group to which the terminal device belongs, a cell group corresponding to the position where the terminal device is located, a frequency used by the terminal device, or an identifier of the terminal device.

The second communication unit of the terminal device performs at least one of the following operations.

After modifying at least one set of measurement frequencies, performing measurement on the modified measurement frequencies; or performing measurement on remaining measurement frequencies after deleting measurement frequencies;

Enabling the measurement corresponding to at least one measurement type;

Disabling the measurement corresponding to at least one measurement type and performing measurement according to the remaining measurement types;

Performing the measurement based on an adjusted measurement time.

The second communication unit of the terminal device performs one of:

prolonging or shortening the measurement time by using a scaling factor of the measurement time, and performing measurement by using the prolonged or shortened measurement time;

determining a number of times for measuring a measurement sample by using a changed value of a number of times for measuring the measurement sample in a measurement time, and performing measurement based on the determined number of times; or determining an adjusted timer based on an indication for adjusting the running state of the timer, and performing measurement under a control of the adjusted timer.

The second communication unit of the terminal device performs one of:

determining to stop the timer based on an indication for stopping a terminal timer, and stopping measurement;

determining to start the timer based on an indication for starting the terminal timer, and starting measurement; or determining to pause the timer based on an indication for pausing the terminal timer, and stopping measurement.

It should be noted that how the terminal device determines the specific content contained in the assistance message and the corresponding processing has been described in the foregoing embodiments and therefore the description will not be repeated here.

In another fourth transmission manner, the network device broadcasts or multicasts the assistance message to the terminal device managed by itself regardless of the current situation of the terminal device. In this case, the terminal device determines, according to its own situation, whether to make a measurement based on the assistance message.

Specifically, the second communication unit of the terminal device performs measurement based on the assistance message in response to a second preset condition being satisfied.

The second preset condition includes at least one of:

a frequency band used by the terminal device is a frequency band corresponding to the assistance message;

the terminal device is a terminal device indicated by the assistance message;

a terminal device group to which the terminal device belongs is a terminal device group corresponding to the assistance message;

a type of the terminal device is a terminal device type corresponding to the assistance message;

a power class of the terminal device is a terminal power class corresponding to the assistance message;

a cell group where the terminal device is located is a cell group corresponding to the assistance message; or a position where the terminal device is located is in a measurement area corresponding to the assistance message. Here, it should be noted that the measurement area may be an area included in the assistance message, which may be the same as or different from the sending area, and the sending area focuses on controlling what kind of assistance message can be transmitted at what position, or controlling whether or not the corresponding assistance message can be transmitted at what position. Here, the measurement area means that the terminal device indicated in the assistance message can be adjusted and then measured in some areas according to the assistance message, while in some areas, it is not needed.

A current time is a measurement time period corresponding to the assistance message. The measurement time period and the sending time period in the foregoing embodiment can be the same or different. The sending time period refers to a time period in which the assistance message is transmitted. Here, the measurement time period refers to a time period indicated by the assistance message for measurement. Once the terminal device determines that the measurement time period is satisfied, the measurement frequency (and/or measurement type and/or measurement time) can be adjusted based on the assistance message, and then the measurement can be performed.

Still in a fifth transmission manner, the second communication unit of the terminal device transmits the assistance message to another terminal device satisfying a third preset condition.

The third preset condition includes at least one of the following conditions:

a frequency band used by the another terminal device is a frequency band corresponding to the assistance message;

the another terminal device is a terminal device indicated by the assistance message;

a terminal device group to which the another terminal device belongs is a terminal device group corresponding to the assistance message;

a type of the another terminal device is a terminal device type corresponding to the assistance message;

a power class of the another terminal device is a terminal power class corresponding to the assistance message;

a cell group where the another terminal device is located is a cell group corresponding to the assistance message;

a position where the another terminal device is located is in a measurement area corresponding to the assistance message; or a current time is in a measurement time period corresponding to the assistance message.

It can be seen that with the above solution, the network device can control the terminal device to shorten part of the measurement time, and/or disable part of the measurement frequencies, and/or disable the measurement of part of the measurement types. In this manner, the terminal device can reduce part of measurements in a certain scenario where frequent measurements are not needed, thereby achieving an effect of saving power consumption of the terminal device without affecting the use of the terminal.

Figure 9:
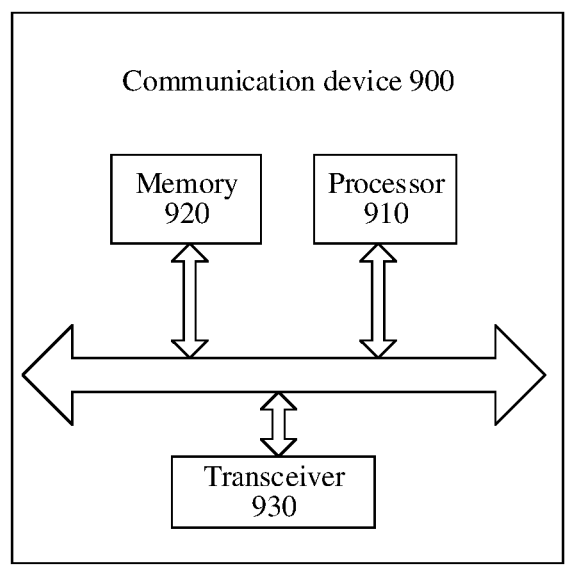
FIG. 9 is a schematic structural diagram of a communication device according to an embodiment of the disclosure.

FIG. 9 is a schematic structural diagram of a communication device 900 according to an embodiment of the disclosure. The communication device in this embodiment may be one of a terminal device, an access network node and a core network device in the foregoing embodiments. The communication device 900 shown in FIG. 9 includes a processor 910 that can invoke and run a computer program from memory to perform the method in the embodiments of the disclosure.

Optionally, as shown in FIG. 9, the communication device 900 may also include a memory 920. The processor 910 may invoke and run a computer program from the memory 920 to perform the method in the embodiments of the disclosure.

The memory 920 may be a separate device independent of the processor 910 or may be integrated in the processor 910.

Optionally, as shown in FIG. 9, the communication device 900 may also include a transceiver 930, the processor 910 may control the transceiver to communicate with another device and in particular to transmit information or data to the another device, or receive information or data from the another device.

The transceiver 930 may include a transmitter and a receiver. The transceiver 930 may further include one or more antennas.

Optionally, the communication device 900 may be specifically a network device of the embodiments of the disclosure, and the communication device 900 may implement corresponding processes implemented by the network device in various methods of the embodiments of the disclosure, which will not be elaborated herein for convenient and brief description.

Optionally, the communication device 900 may specifically be a terminal device of the embodiments of the disclosure, and the communication device 900 may implement corresponding processes implemented by the mobile terminal/terminal device in various methods of the embodiments of the disclosure, which will not be elaborated herein for convenient and brief description.

Figure 10:
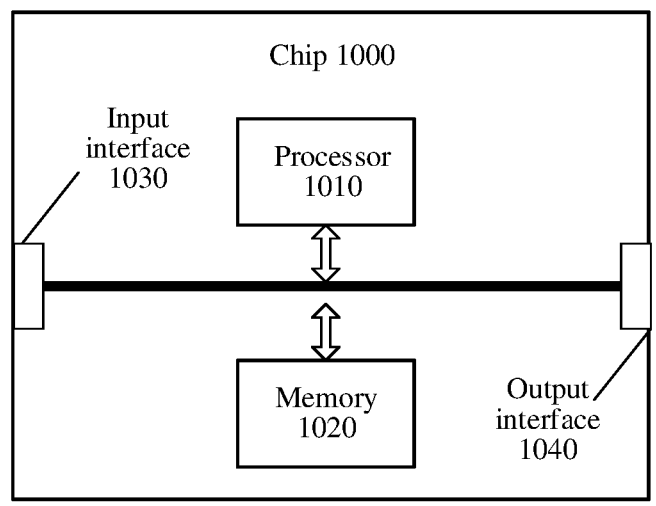
FIG. 10 is a schematic block diagram of a chip according to an embodiment of the disclosure.

FIG. 10 is a schematic structural diagram of a chip according to an embodiment of the disclosure. The chip 1000 shown in FIG. 10 includes a processor 1010 that can invoke and run a computer program from memory to perform the method in embodiments of the disclosure.

Optionally, as shown in FIG. 10, the chip 1000 may also include a memory 1020. The processor 1010 may invoke and run a computer program from the memory 1020 to perform the method in the embodiments of the disclosure.

The memory 1020 may be a separate device independent of the processor 1010 or may be integrated in the processor 1010.

Optionally, the chip 1000 may also include an input interface 1030. The processor 1010 may control the input interface 1030 to communicate with other devices or chips and in particular to obtain information or data transmitted from other devices or chips.

Optionally, the chip 1000 may also include an output interface 1040. The processor 1010 may control the output interface 1040 to communicate with other devices or chips and in particular to output information or data to other devices or chips.

Optionally, the chip can be applied to one of a terminal device, an access network node and a core network device in the embodiments of the disclosure, and the chip can realize the corresponding processes implemented by the terminal device in each method of the embodiments of the disclosure, which will not be elaborated herein for convenient and brief description.

It should be understood that the chips mentioned in the embodiments of the disclosure may also be referred to as system-level chips, system chips, chip systems or system-on-chip chips or the like.

It should be understood that the processor of an embodiment of the disclosure may be an integrated circuit chip having signal processing capability. In implementation, the operations of the above method embodiments may be accomplished by an integrated logic circuitry of hardware in the processor or instructions in the form of software. The processor may be a general purpose processor, a digital signal processor (DSP), an application specific integrated circuit (ASIC), a field programmable gate array (FPGA) or other programmable logic devices, a discrete gate or transistor logic device, or a discrete hardware component. The methods, operations and logic block diagrams disclosed in the embodiments of the disclosure may be implemented or performed. The general purpose processor may be a microprocessor or the processor may be any conventional processor or the like. The operations of the method disclosed in combination with the embodiments of the disclosure can be directly implemented by a hardware decoding processor or may be implemented by a combination of hardware and software modules in the decoding processor. The software module may be located in RAM, flash memory, read-only memory, programmable read-only memory or electrically erasable programmable memory, registers and other storage media mature in the art. The storage medium is located in the memory, and the processor reads the information in the memory and completes the operations of the method in combination with its hardware.

It can be understood that the memory in the embodiments of the disclosure may be volatile memory or non-volatile memory or may include both volatile and non-volatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM) which serves as an external cache. By way of example but not limitation, many forms of RAMs are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchronous connection dynamic random access memory (Synchlink DRAM, SLDRAM), and direct memory bus random access memory (Direct Rambus RAM, DR RAM). It should be noted that the memories of the systems and methods described herein are intended to include, but are not limited to, these and any other suitable types of memory. It should be noted that the memories of the systems and methods described herein are intended to include, but not limited to, these and any other suitable types of memory.

It should be understood that the memory described above is exemplary but not limiting. For example, the memory in the embodiments of the disclosure may also be static random access memory (static RAM, SRAM), dynamic random access memory (dynamic RAM, DRAM), synchronous dynamic random access memory (synchronous DRAM, SDRAM), double data rate synchronous dynamic random access memory (double data rate SDRAM, DDRSDRAM), enhanced synchronous dynamic random access memory (enhanced SDRAM, ESDRAM), synchronous connection dynamic random access memory (synch link DRAM, SLDRAM), direct memory bus random access memory (Direct Rambus RAM, DR RAM), and the like. That is memory in embodiments of the disclosure is intended to include, but not limited to, these and any other suitable types of memory.

Figure 11:
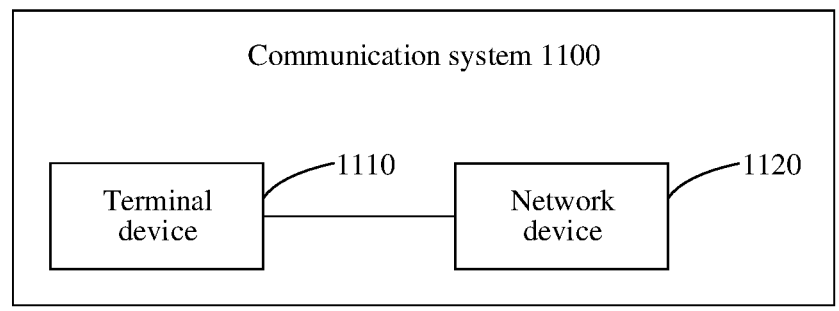
FIG. 11 is a second schematic diagram of a communication system architecture according to an embodiment of the disclosure.

FIG. 11 is a schematic block diagram of a communication system 1100 according to an embodiment of the disclosure. As shown in FIG. 11, the communication system 1100 includes a terminal device 1110 and a network device 1120.

The terminal device 1110 may be used to implement the corresponding functions implemented by the UEs in the above method, and the network device 1120 may be used to implement the corresponding functions implemented by the network devices in the above method, which will not be elaborated herein for convenient and brief description. The network device may be one of the access network node or the core network device.

An embodiment of the disclosure further provides a computer-readable storage medium for storing a computer program.

Optionally, the computer-readable storage medium may be applied to the network device or the terminal device in the embodiments of the disclosure, and the computer program enables the computer to execute the corresponding process implemented by the network device or the terminal device in each method in the embodiment of the disclosure, which will not be elaborated herein for convenient and brief description.

An embodiment of the disclosure also provides a computer program product including computer program instructions.

Optionally, the computer program product may be applied to a network device or a terminal device in an embodiment of the disclosure, and the computer program instructions cause the computer to execute the corresponding process implemented by the network device or the terminal device in the various methods of the embodiment of the disclosure, which will not be elaborated herein for convenient and brief description.

An embodiment of the disclosure also provides a computer program.

Optionally, the computer program may be applied to a network device or a terminal device in an embodiment of the disclosure. When the computer program runs on the computer, the computer performs the corresponding process implemented by the network device or the terminal device in each method in the embodiment of the disclosure, which will not be elaborated herein for convenient and brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that specific working processes of the system, device and unit described above may make reference to the corresponding processes in the aforementioned embodiments of the method, which will not be elaborated herein.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The aforementioned storage medium includes: various media capable of storing program codes such as a U disk, a mobile hard disk, an ROM, an RAM, a magnetic disk or an optical disk.

The above is only the specific implementation manner of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for measurement control, comprising:
transmitting, by a network device, an assistance message to a terminal device, wherein the assistance message is used for adjusting a mobility measurement behavior of the terminal device,
wherein the assistance message comprises:
an indication for enabling at least one measurement type; or
an indication for disabling at least one measurement type, and
wherein the method further comprises:
generating, by the network device, M assistance messages, wherein M is an integer greater than or equal to 1,
wherein among the M assistance messages, information related to different assistance messages is different; and information related to the assistance message comprises at least one of:
a terminal power class corresponding to the assistance message, a cell group corresponding to the assistance message, or an area corresponding to the assistance message.

2. The method of claim 1, wherein the assistance message further indicates at least one of:
a measurement frequency; or
adjusting a measurement time.

3. The method of claim 2, wherein the assistance message further comprises:
a serial number representing at least one set of measurement frequencies to be modified or deleted; or
a serial number representing at least one measurement object to be modified or deleted, wherein the measurement object comprises the measurement frequency.

4. The method of claim 1, wherein transmitting, by the network device, the assistance message to the terminal device comprises:
transmitting, by the network device, the assistance message of the M assistance messages to the terminal device in response to a first preset condition being satisfied, wherein the first preset condition comprises at least one of the following conditions:
a current time is in a sending time period or a receiving time period corresponding to the assistance message; or
an area where the terminal device is located is in a sending area or a receiving area corresponding to the assistance message.

5. The method of claim 1, wherein transmitting, by the network device, the assistance message to the terminal device comprises:
determining, by the network device, to transmit a corresponding assistance message to the terminal device based on information related to the terminal device,
wherein the information related to the terminal device comprises at least one of:
a type of the terminal device, a power class of the terminal device, a position where the terminal device is located, a terminal device group to which the terminal device belongs, a cell group corresponding to the position where the terminal device is located, a frequency used by the terminal device, or an identifier of the terminal device.

6. A method for measurement control, comprising:
receiving, by a terminal device, an assistance message from a network device, wherein the assistance message is used for adjusting a mobility measurement behavior of the terminal device,
wherein the assistance message comprises:
an indication for enabling at least one measurement type; or
an indication for disabling at least one measurement type, and
wherein the method further comprises:
generating, by the network device, M assistance messages, wherein M is an integer greater than or equal to 1,
wherein among the M assistance messages, information related to different assistance messages is different; and
information related to the assistance message comprises at least one of:
a terminal power class corresponding to the assistance message, a cell group corresponding to the assistance message, or an area corresponding to the assistance message.

7. The method of claim 6, wherein the assistance message further indicates at least one of:
a measurement frequency;
or
adjusting a measurement time.

8. The method of claim 7, wherein the assistance message further comprises:
a serial number representing at least one set of measurement frequencies to be modified or deleted; or
a serial number representing at least one measurement object to be modified or deleted, wherein the measurement object comprises the measurement frequency.

9. The method of claim 6, wherein the assistance message is carried by one of the following information:
master information block (MIB);
system information block (SIB);
downlink control information (DCI); or
radio resource control (RRC) signaling.

10. The method of claim 6, further comprising:
transmitting, by the terminal device, information related to the terminal device to the network device,
wherein the information related to the terminal device comprises at least one of:
a type of the terminal device, a power class of the terminal device, a position where the terminal device is located, a terminal device group to which the terminal device belongs, a cell group corresponding to the position where the terminal device is located, a frequency used by the terminal device, or an identifier of the terminal device.

11. The method of claim 6, further comprising:
performing, by the terminal device, a measurement based on the assistance message in response to a second preset condition being satisfied,
wherein the second preset condition comprises at least one of the following conditions:
a frequency band used by the terminal device is a frequency band corresponding to the assistance message;
the terminal device is a terminal device indicated by the assistance message;
a terminal device group to which the terminal device belongs is a terminal device group corresponding to the assistance message;
a type of the terminal device is a terminal device type corresponding to the assistance message;
a power class of the terminal device is a terminal power class corresponding to the assistance message;
a cell group where the terminal device is located is a cell group corresponding to the assistance message;
a position where the terminal device is located is in a measurement area corresponding to the assistance message; or
a current time is in a measurement time period corresponding to the assistance message.

12. A network device, comprising:
a transceiver, configured to transmit an assistance message to a terminal device, wherein the assistance message is used for adjusting a mobility measurement behavior of the terminal device,
wherein the assistance message comprises:
an indication for enabling at least one measurement type; or
an indication for disabling at least one measurement type, and
wherein the method further comprises:
generating, by the network device, M assistance messages, wherein M is an integer greater than or equal to 1,
wherein among the M assistance messages, information related to different assistance messages is different; and
information related to assistance message comprises at least one of:
a terminal power class corresponding to the assistance message, a cell group corresponding to the assistance message, or an area corresponding to the assistance message.

13. The network device of claim 12, wherein the assistance message further indicates at least one of:
a measurement frequency;
or
adjusting a measurement time.

14. The network device of claim 13, wherein the assistance message further comprises:
a serial number representing at least one set of measurement frequencies to be modified or deleted; or
a serial number representing at least one measurement object to be modified or deleted, wherein the measurement object comprises the measurement frequency.

15. The network device of claim 12, wherein the first communication unit is further configured to transmit at least part of the M assistance messages to the terminal device in response to a first preset condition being satisfied,
wherein the first preset condition comprises at least one of the following conditions:
a current time is in a sending time period or a receiving time period corresponding to the assistance message; or
an area where the terminal device is located is in a sending area or a receiving area corresponding to the at least part of assistance messages.

16. The network device of claim 12, wherein the transceiver is further configured to determine to transmit a corresponding assistance message to the terminal device based on information related to the terminal device,
wherein the information related to the terminal device comprises at least one of:
a type of the terminal device, a power class of the terminal device, a position where the terminal device is located, a terminal device group to which the terminal device belongs, a cell group corresponding to the position where the terminal device is located, a frequency used by the terminal device, or an identifier of the terminal device.

* * * * *